April 4, 1939.     H. T. CORY     2,152,730
STRIPPING HARVESTER
Filed July 14, 1938     3 Sheets-Sheet 1

Inventor
Harry Thomas Cory
per
Attorneys

Patented Apr. 4, 1939

2,152,730

UNITED STATES PATENT OFFICE 2,152,730

STRIPPING HARVESTER

Harry Thomas Cory, Washington, D. C.

Application July 14, 1938, Serial No. 219,189

11 Claims. (Cl. 56—19)

(Granted under the act of March 3, 1883, as amended April 30, 1928; 370 O. G. 757)

This application is made under the act of March 3, 1883, as amended by the the act of April 30, 1928, and the invention herein described and claimed, if patented, may be manufactured and used by or for the Government of the United States for governmental purposes without the payment to me of any royalty thereon.

This invention relates to a device for stripping grains from cereal stalks, such as wheat, barley, rice, rye, flaxseed, and so forth.

One of the objects of this invention is to provide a device for collecting or harvesting the grains of such cereals and at the same time leaving in the field the uncut stalks.

Another object of this invention is to provide a device that will strip the grain from the uncut cereal stalks by the use of combs with means for automatically cleaning these combs.

Still another object of this invention is to provide a device that will permit the harvesting of grains in the manner aforesaid in wet or damp weather.

A further object is to provide a device which will permit immediate storage of harvested grain.

A still further object of this invention is to provide a device which will make it possible to utilize the method for harvesting cereal grains which permits the uncut stalks to remain standing in the field and thus remove from the field a minimum amount of organic food, thereby allowing the stalks remaining to be plowed under and reconstituted into the soil as fertilizer.

The method of harvesting grain in this manner has not found a wide use in the past due to the fact that there were no implements available for automatically cleaning the teeth of the combs after each stripping operation. This limitation in the art did not permit successful harvesting in this manner because moisture from any source whatsoever whether it be from the weather or from the cereal itself, would cause the machine to clog and the harvesting would have to be arrested frequently to clean the strippers. The advantages of the present invention where the combs of the strippers are automatically cleaned make it possible to continuously carry on the harvesting without interruption, under any conditions of weather and under any conditions of the cereal itself. With the solution of this long-existing problem, this old method of harvesting can now be brought back into use on a large scale and is beneficial in many respects over the present method of reaping and threshing. One of the advantages of this old method is that since the grain can be harvested without regard to the maturity or damp condition of the straw, and consequently under climatic conditions of rain, dew, snow, or other damp weather, it can be carried on throughout the entire period from sunset to sunrise. Another advantage is that the harvested grain can be more easily threshed because it will require no separation of the grain except from the chaff, the straw being left standing in the field. Still another advantage is that it obviates the necessity of binding cut stalks into bundles or sheaves after harvesting. This invention not only provides for the above advantages, but embraces a simple and inexpensive device that may be manufactured as an attachment of the front of a tractor, both of which may be operated by one individual, thus constituting a great saving in labor.

The following description, considered together with the accompanying drawings, will more fully disclose this invention, and further objects and advantages thereof will be apparent.

Figure 1:
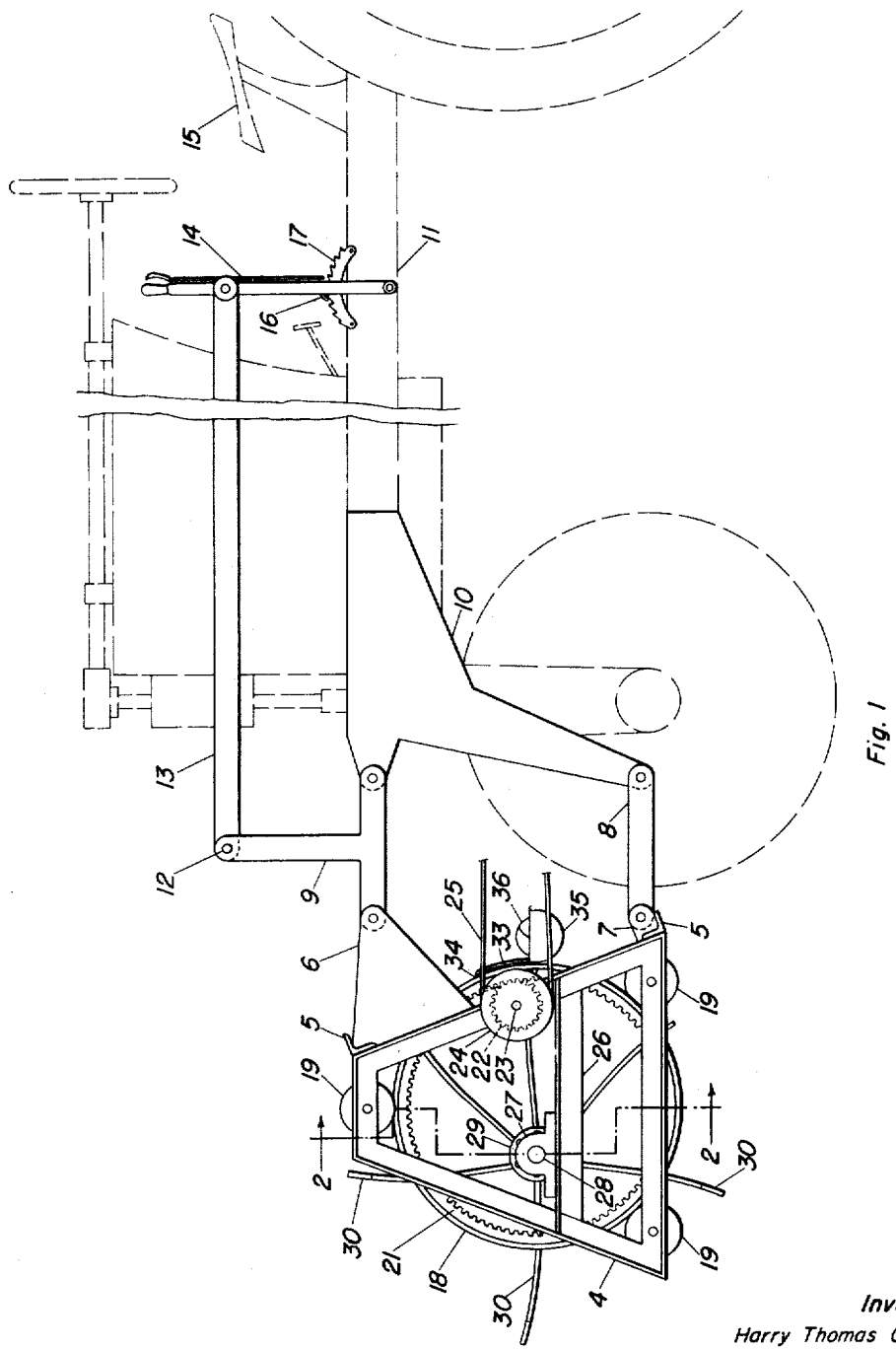
Figure 1 is a side elevational view of this invention as it appears attached to the front of an ordinary farm tractor (shown fragmentarily).
Figure 2:
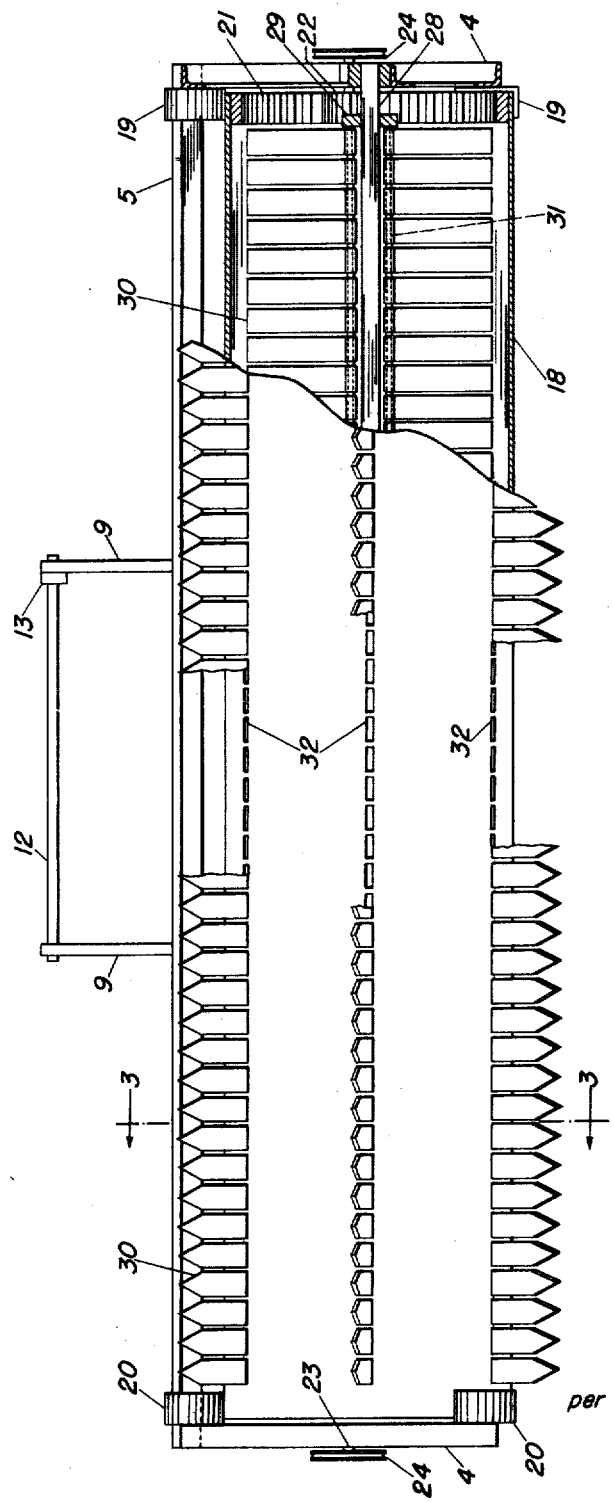
Figure 2 is a front elevational view of this invention detached from the tractor with a partial section along the line 2—2 of Figure 1 and with some of the combs removed to show the slots in which the combs are carried.

Referring with more particularity to the drawings, in which like numerals designate like parts, the numerals 4 4 designate end frames secured together by angles 5 5. The upper part of said end frames carry brackets 6 6, and the lower end of said frames carries brackets 7 7. Two bottom horizontal links 8 8 are secured to the lower brackets 7 7, respectively, and two inverted T-shaped links 9 9 are pivotally secured to the upper brackets 6 6, substantially as shown. The other horizontal ends of each of said links are hingedly mounted to brackets 10 10, said last mentioned brackets being fixed to the frame 11 of the tractor. The two T-shaped links 9 9 are connected by means of a cross shaft 12 to which shaft a horizontal link 13 is pivotally mounted at one end, the other end extending back to the tractor and pivotally secured to a vertical lever 14, the lower end of said lever being fulcrumed near the operator's seat 15 of the tractor. Said lever is provided with a dog 16 to register with a notched segment 17, secured to the frame 11 of the tractor, so that said lever may be held in any position desired within the limits of said segment 17. If desired, two of said levers 14 and appurtenant parts may be provided, one on each side of the tractor, together with another horizontal link, such as link 13, to connect with the cross shaft 12. By such additional duplicate means a more satisfactory support may be provided for the device. The operation of said lever 14 raises or lowers the frames 4 4, and parts attached thereto. However, it is to be understood that the means above described for raising and lowering said frame is only for the purpose of illustration, and other means may be employed such as rack and pinion gears, cable and winch, or any other suitable means.

A hollow cylinder 18 is supported by roller bearings 19 19 19 on one end of the end frames 4, and by roller bearings 20 20 20 on the other end frame.

Figure 3:
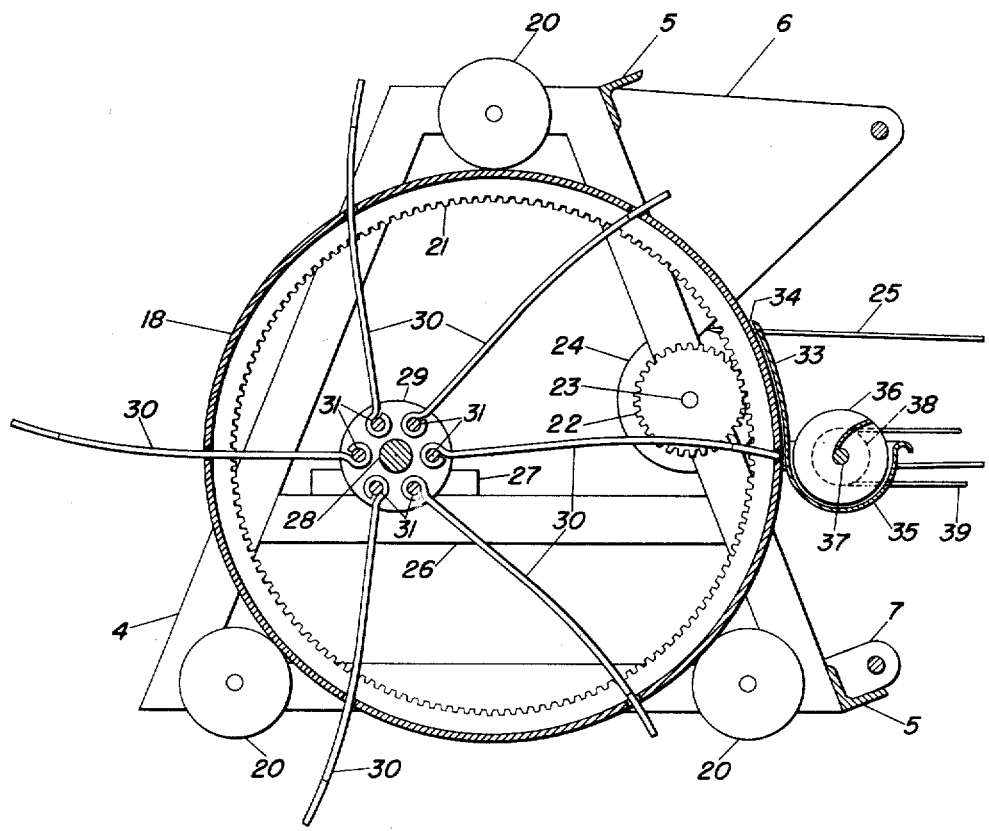
Figure 3 is a cross-sectional view of Figure 2 along the line 3—3.

Internal ring gears 21 21 are provided on both ends of said cylinder 18 in constant mesh with pinion gears 22 22 and said gears 21 21 are rotatably actuated by said pinion gears in a clockwise direction (as would appear in Fig. 1 and Fig. 3). Said pinion gears are mounted on the end frames 4 4 by means of shafts 23 23 extending through the frame, the extended ends of the shafts being fixed to pulleys 24 24. Suitable bearings are provided for these shafts 23 23. Belts 25 25 transmit power to said pulleys 24 24 from a suitable power takeoff (not shown) of the tractor.

Cross braces 26 26 on each of the end frames 4 4 carry bearings 27 27 within which the shaft 28 is rotatably mounted. This mounting is made in such a manner that the axis of the shaft 28 falls on an approximately horizontal diameter of the cylinder 18 and forwardly eccentric to the imaginary axis thereof.

Radial end flanges 29 29 are fixed to the shaft 28. The stripping teeth 30 are hingedly mounted at intervals throughout the entire length of the cylinder 18 to shafts 31 31 31 31 31 31, said shafts bearing in said radial flanges in annular spaced relation the horizontal distance between successive teeth being sufficient to permit the entrance of grain stalks without permitting passage of the smallest size grains to be harvested. Additional radial flanges (not shown) may be provided at optimum points along the shaft 28 for additional support of shafts 31 31 31 31 31 31. Also, the teeth 30 may be fabricated in comblike sections and each section hinged to similar radial flanges by any suitable means. These teeth terminate at their outer edges in a point and project through slots 32 in the hollow cylinder 18. The length of each tooth is such that the maximum projection through the cylinder is twice the length of the eccentricity of the axis of the shaft 28 from the imaginary axis of the cylinder 18. Consequently, the minimum projection of each tooth is substantially zero. The arrangement is also made for the maximum projection of said teeth to be on the forward side of cylinder 18 and the minimum projection thereof directly opposite. A portion of the outer part of said teeth are slightly curved in the direction of rotation to prevent stripped grains from spilling before they are carried to the top of the cylinder 18.

On the rearward side of said hollow cylinder 18 near the point of minimum projection of said teeth, a guide plate 33 is longitudinally disposed throughout the entire length of said cylinder. A small clearance 34 is maintained between the said guide plate and cylinder and the guide plate extends to a longitudinal trough 35 for catching the stripped grain. Within said trough 35, a conveyor screw 36 is rotatably mounted longitudinally, and an extended shaft 37 projects through one side of the trough 35 to which shaft a pulley 38 is fixed. Said pulley is driven by a belt 39 from a suitable power takeoff (not shown) on the tractor. It is to be understood, however, that other means may be provided for rotating said conveyor screw, as well as means other than the conveyor screw for accomplishing the result of moving the stripped grain to one end of the trough, such as air suction, or forced draft, or bucket conveyors, etc.

The operation of this invention is as follows: By means of the lever 14, the elevation of the device is adjusted so that the teeth at their position of maximum projection will be approximately at the median height of the heads of the cereal to be harvested. Then the cylinder 18 is started rotating, and the tractor is driven through the grain to be harvested. As the individual teeth advance forward and upward, the cereal stalks pass between the teeth and are stripped of their grain. This stripped grain is caught and held between the curved portion of the teeth and the outer periphery of the cylinder 18, and they are carried around with the cylinder in its rotation. As the teeth and cylinder pass the highest point of circumference and start downward, the stripped grain leaves the cylinder in its descent as a result of two component forces, namely gravitational and centrifugal. This is sufficient to keep the grain out of the clearance space 34 between the cylinder 18 and the guide plate 33, and to impel it to fall into the trough 35. The grain falling into the trough is carried to one end thereof by means of the conveyor screw 36, and collected in any suitable manner and by any suitable means. At the same time, the teeth in this quadrant are being pulled inside the cylinder and the wall of the slots through which the teeth project, scrape out all accumulated material from their interstices, leaving them clean for the next stripping operation.

Normally it will be desired to dry the collected grain and any foreign matter contained therein by the use of grain driers or otherwise, after which a simple operation such as willowing may be employed to separate the chaff from the grain and leave it free from foreign matter with a satisfactory low moisture content for indefinite storage.

Having thus described my invention, I claim:

1. A device for stripping grain from uncut cereals, said device comprising a hollow cylinder rotatably mounted on peripheral bearings, ring gears fixed to the ends of said cylinder, pinion gears in constant mesh with said ring gears, means for rotatably actuating said pinion gears, a longitudinal shaft parallel and eccentric to the axis of said cylinder, radial flanges secured to said shaft in spaced relation, a plurality of arcuated teeth hinged to each of said flanges, said teeth being so disposed as to project through slots in said cylinder, the length of maximum projection of said teeth being twice the quantitative eccentricity of said shaft to the axis of said cylinder.

2. The device described in claim 1 with means for collecting the harvested grain near the point of minimum projection of said teeth.

3. The device described in claim 1 with means for attaching said device to the front of a tractor.

4. The device described in claim 1 with means for adjusting the elevation of said device on the front of a tractor.

5. A device for stripping grain from uncut cereals comprising a hollow cylinder rotatably mounted on peripheral bearings, means for rotatably actuating said cylinder, a longitudinal shaft eccentrically mounted with respect to the axis of said hollow cylinder, a plurality of radial flanges secured to said shaft in spaced relation, and a plurality of teeth hinged to said flanges, said teeth projecting radially through parallel rows of apertures in said cylinder.

6. A device for stripping grain, said device comprising a hollow cylinder rotatably mounted, means for rotatably actuating said cylinder, a shaft eccentrically mounted with respect to the axis of said hollow cylinder, and a plurality of teeth hingedly mounted to said shaft, said teeth projecting through parallel rows of apertures in said cylinder.

7. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth hinged to said shaft, said teeth projecting through parallel rows of apertures in said cylinder, the distance between consecutive teeth in each row being optimum for the stripping of grain from uncut cereals.

8. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth hinged to said shaft, said teeth projecting through parallel rows of apertures in said cylinder, the distance between consecutive teeth in each row being sufficient to permit the introduction of cereal stalks but insufficient to permit the passage of the grain thereof.

9. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth hinged to said shaft, said teeth projecting through parallel rows of apertures in said cylinder, the distance between consecutive teeth in each row being wider than the stalk of the cereals to be harvested but narrower than the grain thereof.

10. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth, arcuated in the normal direction of rotation of said cylinder, hinged to said shaft, said teeth projecting through parallel rows of apertures in said cylinder.

11. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth, arcuated in the normal direction of rotation of said cylinder, hinged to said shaft, said teeth projecting through parallel rows of apertures in said cylinder, the distance between consecutive teeth in each row being wider than the stalk of the cereal to be stripped but narrower than the grain thereof.

HARRY THOMAS CORY.

---

CERTIFICATE OF CORRECTION.

Patent No. 2,152,730.     April 4, 1939.

HARRY THOMAS CORY.

It is hereby certified that error appears in the printed specification of the above numbered patent requiring correction as follows: Page 2, second column, line 49, for the word "willowing" read winnowing; and that the said Letters Patent should be read with this correction therein that the same may conform to the record of the case in the Patent Office.

Signed and sealed this 23rd day of May, A.D. 1939.

Henry Van Arsdale
Acting Commissioner of Patents.

(Seal)

for adjusting the elevation of said device on the front of a tractor.

5. A device for stripping grain from uncut cereals comprising a hollow cylinder rotatably mounted on peripheral bearings, means for rotatably actuating said cylinder, a longitudinal shaft eccentrically mounted with respect to the axis of said hollow cylinder, a plurality of radial flanges secured to said shaft in spaced relation, and a plurality of teeth hinged to said flanges, said teeth projecting radially through parallel rows of apertures in said cylinder.

6. A device for stripping grain, said device comprising a hollow cylinder rotatably mounted, means for rotatably actuating said cylinder, a shaft eccentrically mounted with respect to the axis of said hollow cylinder, and a plurality of teeth hingedly mounted to said shaft, said teeth projecting through parallel rows of apertures in said cylinder.

7. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth hinged to said shaft, said teeth projecting through parallel rows of apertures in said cylinder, the distance between consecutive teeth in each row being optimum for the stripping of grain from uncut cereals.

8. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth hinged to said shaft, said teeth projecting through parallel rows of apertures in said cylinder, the distance between consecutive teeth in each row being sufficient to permit the introduction of cereal stalks but insufficient to permit the passage of the grain thereof.

9. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth hinged to said shaft, said teeth projecting through parallel rows of apertures in said cylinder, the distance between consecutive teeth in each row being wider than the stalk of the cereals to be harvested but narrower than the grain thereof.

10. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth, arcuated in the normal direction of rotation of said cylinder, hinged to said shaft, said teeth projecting through parallel rows of apertures in said cylinder.

11. A device for stripping grain from cereal stalks comprising a hollow cylinder rotatably mounted, means for rotatably actuating said cylinder, a shaft eccentrically mounted with respect to the longitudinal axis of said cylinder, and a plurality of teeth, arcuated in the normal direction of rotation of said cylinder, hinged to said shaft, said teeth projecting through parallel rows of apertures in said cylinder, the distance between consecutive teeth in each row being wider than the stalk of the cereal to be stripped but narrower than the grain thereof.

HARRY THOMAS CORY.

---

CERTIFICATE OF CORRECTION.

Patent No. 2,152,730.     April 4, 1939.

HARRY THOMAS CORY.

It is hereby certified that error appears in the printed specification of the above numbered patent requiring correction as follows: Page 2, second column, line 49, for the word "willowing" read winnowing; and that the said Letters Patent should be read with this correction therein that the same may conform to the record of the case in the Patent Office.

Signed and sealed this 23rd day of May, A.D. 1939.

Henry Van Arsdale
Acting Commissioner of Patents.

(Seal)